(12) United States Patent
Kuczera et al.

(10) Patent No.: US 10,093,516 B2
(45) Date of Patent: Oct. 9, 2018

(54) ELEVATOR HAVING A BRAKING DEVICE

(71) Applicants: ThyssenKrupp Elevator AG, Essen (DE); ThyssenKrupp AG, Essen (DE)

(72) Inventors: Thomas Kuczera, Leinfelden-Echterdingen (DE); Walter Hoffmann, Niedernhausen (DE)

(73) Assignees: THYSSENKRUPP ELEVATOR AG, Essen (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 15/301,478

(22) PCT Filed: Mar. 31, 2015

(86) PCT No.: PCT/EP2015/057074
§ 371 (c)(1),
(2) Date: Oct. 3, 2016

(87) PCT Pub. No.: WO2015/150406
PCT Pub. Date: Oct. 8, 2015

(65) Prior Publication Data
US 2017/0029248 A1 Feb. 2, 2017

(30) Foreign Application Priority Data
Apr. 4, 2014 (DE) .................. 10 2014 104 865

(51) Int. Cl.
*B66B 5/18* (2006.01)
*B66B 1/36* (2006.01)
(Continued)

(52) U.S. Cl.
CPC .............. *B66B 5/18* (2013.01); *B66B 1/365* (2013.01); *F15B 11/08* (2013.01);
(Continued)

(58) Field of Classification Search
CPC ... B66B 5/18; B66B 1/365; B66B 9/00; F15B 11/08; F15B 13/0401; F15B 2211/30525; F16D 65/16
See application file for complete search history.

(56) References Cited

U.S. PATENT DOCUMENTS 3,583,500 A * 6/1971 Randall ................ E21B 21/08
175/38
4,615,174 A * 10/1986 Nagahara ............ F15B 13/0422
60/442
(Continued)

FOREIGN PATENT DOCUMENTS

CH 684190 A5 7/1994
CN 1428287 A 7/2003
(Continued)

OTHER PUBLICATIONS

Int'l Search Report for PCT/EP2015/057074 dated Jun. 29, 2015 (dated Jul. 6, 2015).
(Continued)

*Primary Examiner* — Michael A Riegelman
(74) *Attorney, Agent, or Firm* — thyssenkrupp North America, Inc.

(57) ABSTRACT

An elevator may include a braking device such as a safety gear system or a service brake, for instance. The braking device may include a hydraulically-acting brake for braking an elevator car of the elevator. The braking device may further include a hydraulic unit with a pump assembly, a brake cylinder assembly, and a valve assembly for ventilating the brake. Further, the hydraulic unit may be fastened to the braking device.

18 Claims, 4 Drawing Sheets

(51) Int. Cl.
  *F15B 11/08* (2006.01)
  *F15B 13/04* (2006.01)
  *F16D 65/16* (2006.01)
  *B66B 9/00* (2006.01)

(52) U.S. Cl.
  CPC .......... *F15B 13/0401* (2013.01); *F16D 65/16* (2013.01); *B66B 9/00* (2013.01); *F15B 2211/30525* (2013.01)

(56) References Cited

U.S. PATENT DOCUMENTS

| | | | | |
|---|---|---|---|---|
| 4,720,975 | A * | 1/1988 | Gunter | B66D 5/26 60/442 |
| 5,014,828 | A * | 5/1991 | Baldassarre | B66B 5/18 187/288 |
| 5,244,060 | A * | 9/1993 | Tanaka | B66B 1/32 187/261 |
| 5,265,701 | A * | 11/1993 | Ogasawara | B66B 5/18 187/254 |
| 5,323,878 | A * | 6/1994 | Nakamura | B66B 1/32 187/264 |
| 5,353,895 | A | 10/1994 | Camack et al. | |
| 5,648,644 | A * | 7/1997 | Nagel | B66B 5/18 187/288 |
| 5,739,610 | A * | 4/1998 | Nemoto | F16B 55/2245 188/158 |
| 6,142,266 | A * | 11/2000 | Appeldorn | B60T 13/743 188/171 |
| 6,193,026 | B1 * | 2/2001 | Sevilleja | B60T 13/22 187/288 |
| 7,591,351 | B2 * | 9/2009 | Fischer | B66B 5/18 188/161 |
| 8,091,355 | B2 * | 1/2012 | St. Aubin | E02F 9/2203 60/459 |
| 2016/0152441 | A1 * | 6/2016 | Tschuppert | B66B 5/18 303/10 |
| 2016/0221795 | A1 * | 8/2016 | Dudde | B66B 5/18 |
| 2017/0023025 | A1 * | 1/2017 | Hahn | B66C 13/20 |
| 2017/0029247 | A1 * | 2/2017 | Kuczera | B66B 5/18 |

FOREIGN PATENT DOCUMENTS

| | | |
|---|---|---|
| CN | 1469835 A | 1/2004 |
| CN | 202022696 U | 11/2011 |
| DE | 202004017585 U1 | 1/2005 |
| DE | 202004017587 U1 | 1/2005 |
| DE | 60112294 T2 | 1/2006 |
| DE | 102007015277 A1 | 10/2007 |
| DE | 102007041411 B3 | 1/2009 |
| DE | 202011051664 U1 | 1/2012 |
| DE | 102012109969 A1 | 4/2013 |
| EP | 0648703 A1 | 4/1995 |
| EP | 1067084 A1 | 1/2001 |

OTHER PUBLICATIONS

Chinese Office Action issued in Chinese application No. 201580018214.4, dated May 16, 2018. [No translation available].
English language Abstract for EP 1067084 A1 listed above.
English language Abstract for DE 202011051664 U1 listed above.
English language machine translation for DE 202004017585 U1 listed above.
English language Abstract for DE 102007015277 A1 listed above.
English language machine translation for DE 202004017587 U1 listed above.
English language Abstract for DE 60112294 T2 listed above.
English language Abstract for CH 684190 A5 listed above.
English language Abstract for DE 102012109969 A1 listed above.
English language Abstract for DE 102007041411 B3 listed above.

* cited by examiner

ELEVATOR HAVING A BRAKING DEVICE

CROSS REFERENCE TO RELATED APPLICATIONS

This application is a U.S. National Stage Entry of International Patent Application Serial Number PCT/EP2015/057074, filed Mar. 31, 2015, which claims priority to German Patent Application No. DE 10 2014 104 865.2 filed Apr. 4, 2014, the entire contents of both of which are incorporated herein by reference.

FIELD

The present disclosure relates to elevators with braking devices such as safety gear systems and/or service brakes that employ a hydraulically-acting brake.

BACKGROUND

In elevators, there is an urgent requirement for safety gear and service brakes which reliably decelerate an elevator car of the elevator to a standstill if excessive speeds and/or uncontrolled travel movements occur.

Safety gear systems hitherto have had, for the purpose of triggering them, a mechanical speed limiter, a limiter cable, a deflection pulley with a tensioning weight and a lever structure between the limiter cable and the safety gear system.

Alternatively, a safety gear system can be triggered electrically. To do this, sensors such as e.g. travel sensors and accelerator sensors of a two-channel design detect an excessive speed of the elevator car.

Wedge-type safety gear systems are known for performing emergency braking of an elevator having a movable wedge, which can be placed in contact with a guide rail of the elevator for breaking purposes. Instead of a wedge-type safety gear system, a brake which has flat brake linings and in which the spring force is applied from a spring packet or disk spring packet which is ventilated, i.e. released, during the normal operation of the elevator can be used. EP 0648703 A1 discloses hydraulically ventilating (keeping the brake open) such a spring. A motor pump is provided for generating the hydraulic pressure. However, the motor pump with its connecting lines takes up a large amount of installation space.

There is a need for a hydraulic unit for hydraulically ventilating a brake which requires a particularly small amount of installation space.

DETAILED DESCRIPTION

Figure 1:
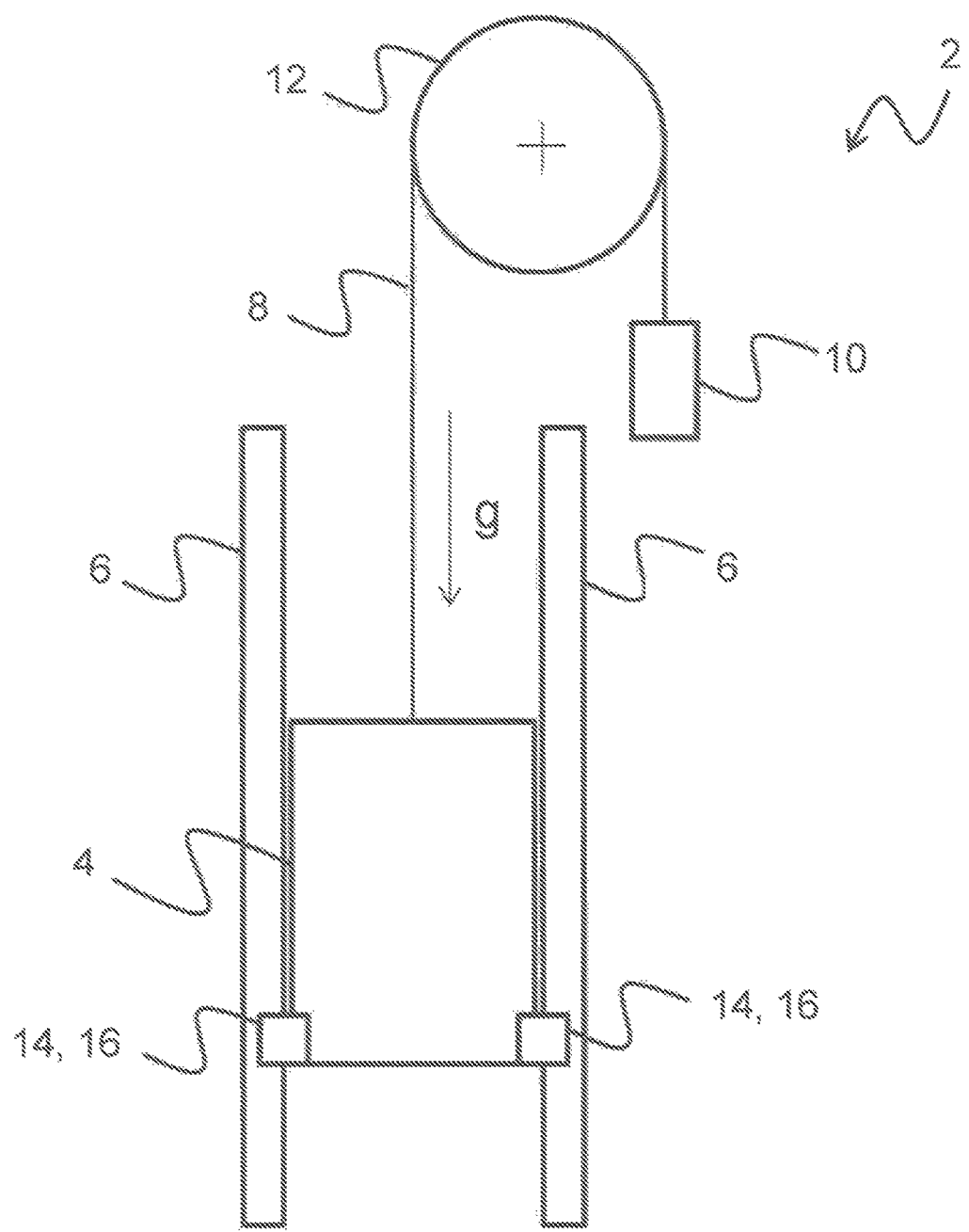
FIG. 1 is a schematic view of an example elevator including an example braking device and an example hydraulic unit.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element.

Some examples of the present disclosure involve an elevator having a braking device with a brake and with a hydraulic unit for ventilating the brake.

The elevator according to the invention has a braking device, in particular a safety gear system or a service brake, wherein the braking device has a hydraulically acting brake for braking and/or stopping an elevator car of the elevator, and a hydraulic unit having a pump assembly, a brake cylinder assembly and a valve assembly for ventilating the brake. The hydraulic unit is integrated into the braking device.

The invention makes available a component which requires a particularly small amount of installation space since the hydraulic unit is attached or fastened directly to the braking device. It is therefore possible, e.g. to dispense with hydraulic lines which take up installation space. As a result of the fact that the pump assembly, the brake cylinder assembly and the valve assembly are combined in the hydraulic unit, a hydraulic unit with compact dimensions is also made available. The pump assembly makes available the hydraulic pressure, necessary for operation, for keeping the brake open (ventilating). There is therefore no need for any separate pump assembly or connecting lines. The piston which is mounted prestressed in a sprung fashion in the cylinder of the brake cylinder assembly ensures that when there is a pressure loss in the cylinder the spring is relaxed and therefore vents the brake (closing the brake). The operational reliability is therefore increased with a simple and compact design, wherein the at least one valve connects a first chamber of the cylinder to the hydraulic unit in such a way as to deliver hydraulic oil, in order to ventilate the brake. The compact dimensions reduce the line lengths of hydraulic oil lines, with the result that the necessary minimum operating quantity of oil is reduced. At the same time, the compact dimensions reduce the reaction times of the hydraulic unit as well as its weight and consumption of energy.

In one advantageous refinement of the invention, the pump assembly, the brake cylinder assembly and the valve assembly are accommodated in to a common housing. The housing can be embodied as a metal housing or as an injection molded plastic housing. The housing can be embodied completely or partially in a closed fashion. In addition, the housing can be of particularly simple design, this is because owing to the combination of the pump assembly, brake cylinder assembly and valve assembly to from one unit there is no need for hydraulic lines to be led through the housing.

In one advantageous refinement of the invention, the brake cylinder assembly has a piston which can be displayed in a cylinder, wherein the piston is prestressed in a sprung fashion by means of a spring. The valve assembly has at least one valve, wherein in at least one first switched state the valve ventilates the brake. For this purpose, in the first switched state of the valve a first chamber of the cylinder is connected to the pump assembly in such a way as to deliver hydraulic oil. The pump assembly makes available the hydraulic pressure, necessary for operation, for ventilating the brake. Therefore, no separate pump assembly or connecting lines are necessary. The piston which is mounted prestressed in a sprung fashion in the cylinder of the brake cylinder assembly ensures that in the event of a pressure loss in the cylinder the spring is relaxed and therefore vents the brake. The operational reliability is therefore increased with a simple and compact design, wherein the at least one valve connects the first chamber of the cylinder to the hydraulic unit in such a way as to deliver hydraulic oil, in order to ventilate the brake.

In one advantageous refinement of the invention, the braking device has a base body, wherein the hydraulic unit is fastened to the base body. As a result, a particularly simple design without additional connecting means between the braking device and the hydraulic unit is possible.

In one advantageous refinement of the invention, the pump assembly has a submersible pump. A submersible pump is understood here to be a pump which dips into the fluid to be conveyed, i.e. hydraulic oil. As a result, high-performance pumps with compact dimensions can be used.

In one advantageous refinement of the invention, the piston divides a cylinder interior space of the cylinder into a first chamber and a second chamber, wherein the spring is accommodated in the second chamber. As a result, the requirement for installation space is reduced further.

In one advantageous refinement of the invention, in a second switched state of the valve the second chamber is connected to the pump assembly in such a way as to deliver hydraulic oil. This ensures that by feeding hydraulic oil to the second chamber a hydraulic oil pressure acts on the piston in order to move the brake from the non-acting (ventilated) switched state into the acting (non-ventilated) switched state.

In one advantageous refinement of the invention, the at least one valve of the valve assembly is embodied as a 3/2-way valve. The valve assembly therefore has a particularly simple design and takes up only a small amount of installation space. However, other types of valve can also be used.

In one advantageous refinement of the invention, the valve assembly has at least two valves which are connected in parallel. Redundancy is therefore made available for the case in which one of the two valves is functionally incapable or the means of actuating one of the two valves is defective. This can improve the operational reliability.

In one advantageous refinement of the invention, the hydraulic unit has a closed hydraulic oil circuit. As a result, the hydraulic unit has a particularly simple design and requires only a small minimum operating quantity of oil.

In one advantageous refinement of the invention, the hydraulic circuit is designed to conduct hydraulic oil which escapes from the cylinder of the brake cylinder assembly to the pump assembly. This ensures that hydraulic oil losses are minimized and therefore the overall quantity of hydraulic oil which is necessary for operation can be reduced, since an equalizing amount for compensating losses can be reduced.

In addition, the invention includes a hydraulic unit for ventilating a brake of such a braking device.

With reference now to the figures, those having ordinary skill in the art will understand that further advantages and refinements of the invention can be found in the accompanying figures.

Of course, the features which are mentioned above and those which are to be explained below can be used not only in the respectively specified combination but also in other combinations or alone without departing from the scope of the present invention.

The present disclosure is illustrated schematically in the figures by way of examples and is described in detail below with reference to the figures.

In FIG. 1, an elevator 2 is illustrated in schematic form as an example elevator system.

The elevator 2 has in the present exemplary embodiment an elevator car 4 for transporting persons and/or loads, which elevator car 4 is mounted so as to be movable in or counter to the direction of gravity g in an elevator shaft on two guide rails 6 running parallel to one another. In contrast to the present exemplary embodiment, the elevator car 4 can, however, be mounted so as to be movable, e.g. on a single guide rail.

In order to move the elevator car 4, a drive is provided which is embodied in the present exemplary embodiment as a traction sheave drive. The elevator car 4 can therefore have a cabin and a safety frame (both not illustrated). In the present exemplary embodiment, the drive has a suspension rope 8 which is fastened to the roof of the elevator car 4. The suspension rope 8 runs over a traction sheave 12, which can be motor-driven by means of a motor (not illustrated), in order to move the elevator car 4. Provided at the other end, lying opposite the elevator car 4, of the suspension rope 8 is a counterweight 10 which reduces the expenditure of force to move the elevator car 4 through the equalization of weight. In contrast to the present exemplary embodiment, the elevator can be embodied as an elevator without a supporting medium. An elevator without a supporting medium is an elevator system which does not use any cables or belts which are driven by a traction sheave 12. The drive of these elevators is located directly on the elevator car 4. For example rack and pinion drives and linear drives are used here.

In order to brake the elevator car 4 to a standstill if excessive speeds and/or uncontrolled travel movements of the elevator car 4 occur, a braking device 14 is provided which in the present exemplary embodiment is embodied as safety gear and/or a service brake. In the present exemplary embodiment a hydraulic unit 16 is provided for hydraulically venting the braking device 14.

Figure 2:
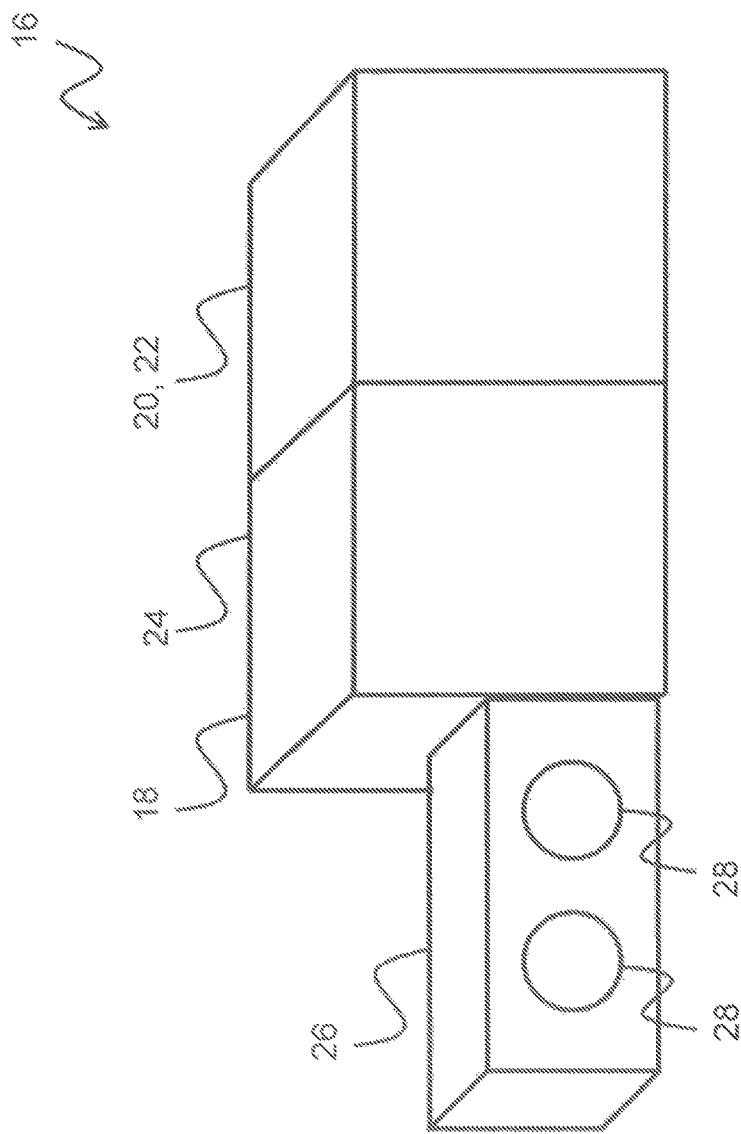
FIG. 2 is a schematic perspective view of an example hydraulic unit.

FIG. 2 shows the hydraulic unit 16 in detail.

In the present exemplary embodiment, the hydraulic unit 16 has a pump assembly 20, a brake cylinder assembly 24 and a valve assembly 26.

The pump assembly 20, the brake cylinder assembly 24 and the valve assembly 26 are accommodated in a common housing 18 to form one integrated component. In the present exemplary embodiment, the housing 18 is a metal housing. The housing 18 can also be an injection molded plastic housing.

In the present exemplary embodiment, the pump assembly 20 has a submersible pump 22. In addition, the valve assembly 26 has two valves 28 which, as will be explained later, are connected in parallel, in order to provide redundancy.

Figure 3:
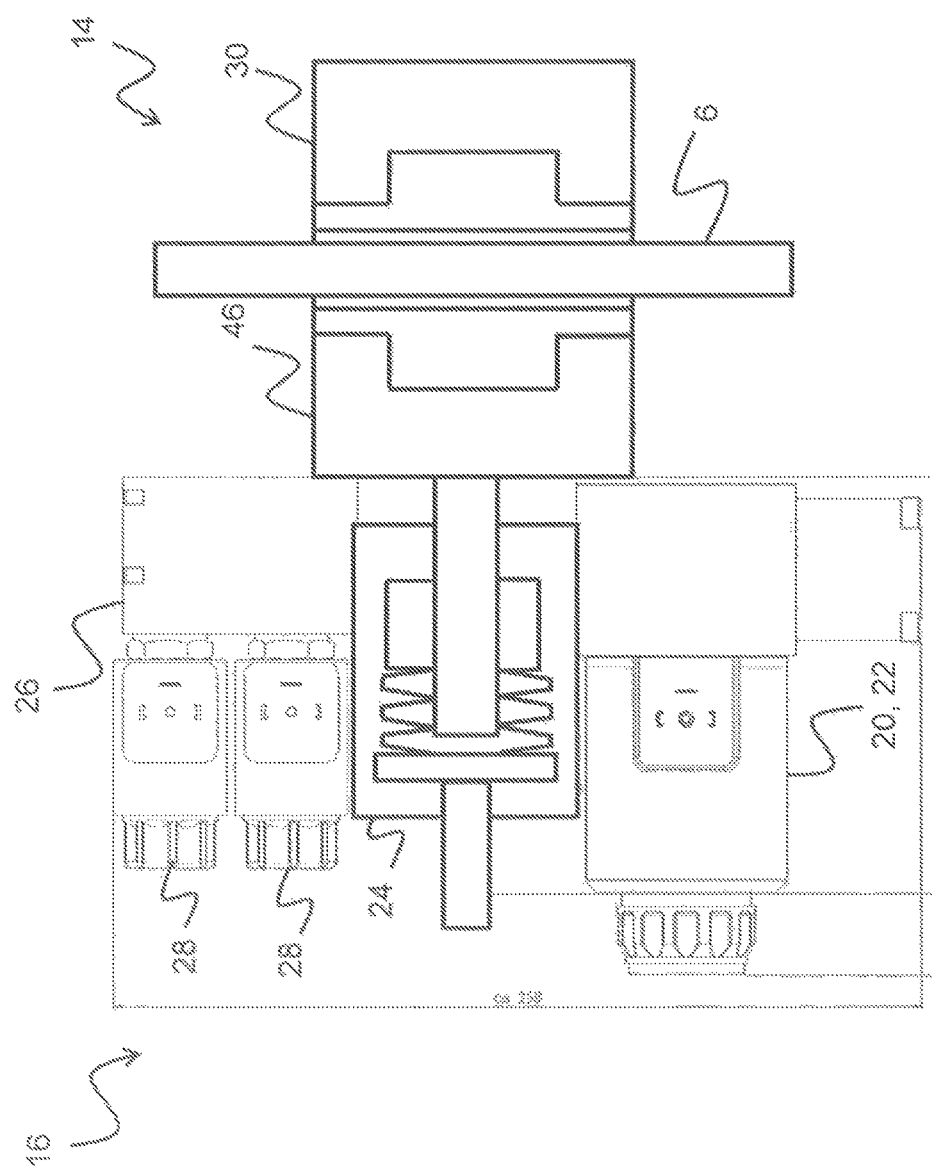
FIG. 3 is a schematic sectional view of the hydraulic unit of FIG. 2, connected to a braking device.

FIG. 3 shows the hydraulic unit 16 connected to the braking device 14. In this context, the hydraulic unit 16 is connected directly to a base body 46 of the braking device 14. In the present exemplary embodiment, the braking device 14 has a brake 30 which is fastened to the base body 46 and has brake linings of flat design. When a brake 30 is vented, the brake linings lie against the guide rail 6 in order to brake the elevator car 4.

Figure 4:
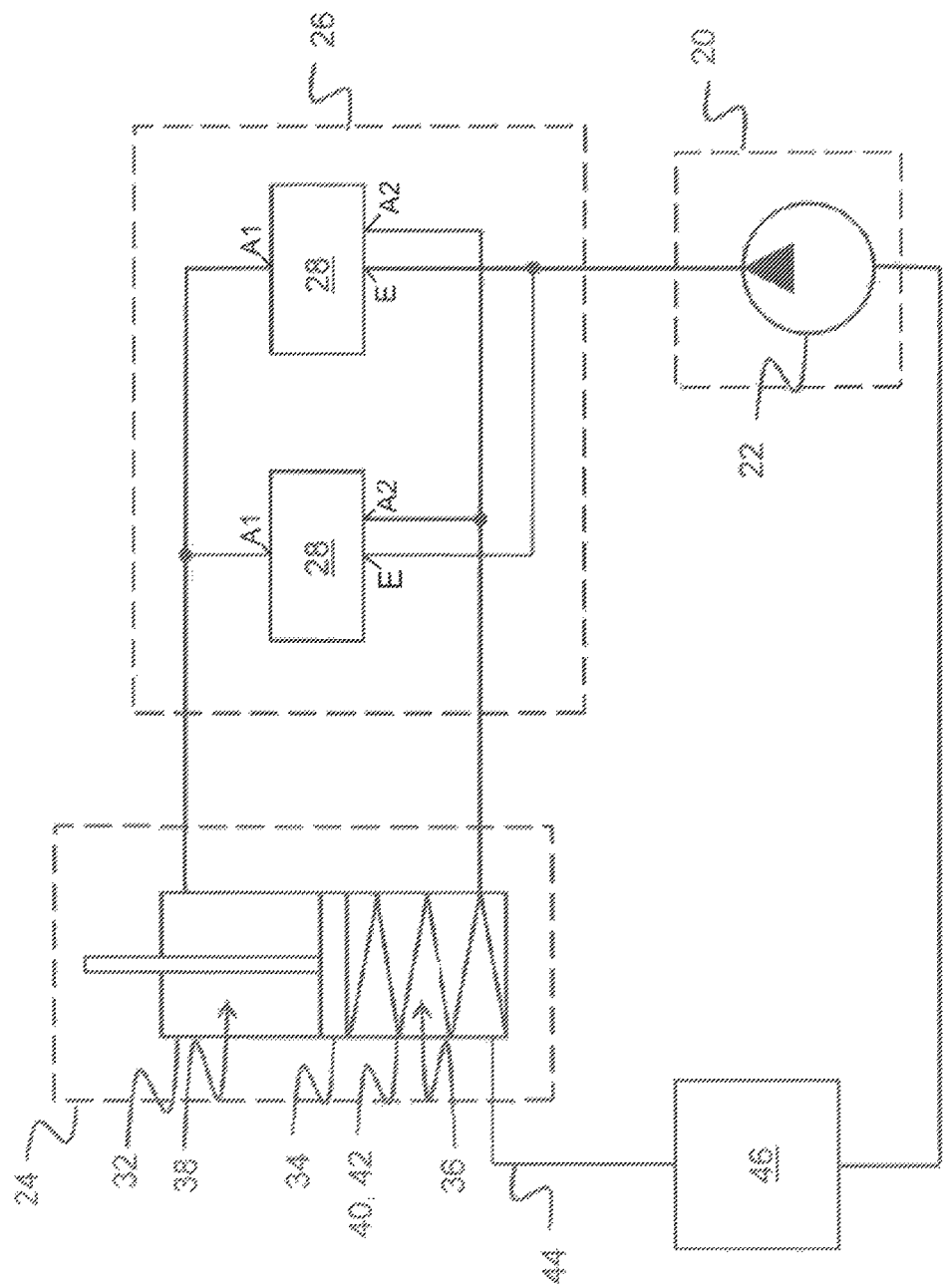
FIG. 4 is a schematic view of an example hydraulic circuit of the hydraulic unit.

FIG. 4 shows the hydraulic unit with a closed hydraulic circuit 44.

The hydraulic circuit 44 connects the pump assembly 20, the brake cylinder assembly 24 and the valve assembly 26 to one another in such a way as to conduct hydraulic oil.

In the present exemplary embodiment, the two valves 28 of the valve assembly 26 are embodied as 3/2-way valves.

Furthermore, further details of the brake cylinder assembly 24 can be seen in FIG. 4. The brake cylinder assembly 24 has a piston 34 which can be moved in a cylinder 32. The piston 34 divides a cylinder interior space of the cylinder 32 into a first chamber 38 and a second chamber 36. In this context, the piston 34 is prestressed in a sprung fashion. For this purpose, a spring 40 is provided in the interior of the piston 34. In the present exemplary embodiment, the spring 40 is a disk spring packet 42. The spring 40 or the disk spring packet 42 are accommodated in the second chamber 36.

On the input side (input E), each of the valves 28 of the valve assembly 26 is connected to the pump assembly 20, while a respective first outlet A1 of the valves 28 is connected to the first chamber 38 so as to conduct hydraulic oil, and a respective second outlet A2 of the valves 28 is connected to the second chamber 36 in such a way as to conduct hydraulic oil.

Therefore, the first chamber 38 and/or the second chamber 36 are connected to the two valves 28 of the valve assembly 26 in such a way as to conduct hydraulic oil.

In addition, in the present exemplary embodiment a sensor assembly (not illustrated) is provided with which a movement of the piston 34 in the cylinder 32 can be detected, e.g. on the basis of a pressure loss in the hydraulic circuit 44.

The pump assembly 20 can have, in addition to the submersible pump 22 provided in the present exemplary embodiment, in addition a non-return valve (not illustrated) and/or an overpressure valve (not illustrated).

During the normal operation, i.e. when the braking device 14 is not active, the pump assembly 20 pumps hydraulic oil through the valves 28 of the valve assembly 26 which are in a first switched state, and delivers said hydraulic oil into the first chamber 38 of the brake cylinder assembly 24. There, the hydraulic oil which is under pressure brings about ventilation of the brake 30. At the same time, in the present exemplary embodiment the first chamber 38 additionally has the function of an accumulator for the hydraulic oil.

If the braking device 14 is then activated on the basis of e.g. an excessive speed of the elevator car 4, at least one of the two valves 28 changes from its first switched state into its second switched state. The valve assembly 26 then disconnects the first chamber 38 from the hydraulic circuit 44. In this way, there is no force counteracting the spring force of the spring 40 available in the first chamber 38, with the result that the spring 40 relaxes and the brake 30 of the braking device 14 is no longer vented. In addition, the hydraulic oil brings about lubrication of the spring 40 there. In this case, a first control signal of e.g. 24 volts is assigned to the first switched state, and a second control signal e.g. 0 volts is assigned to the second switched state.

Thus if just one of the two valves 28 is intact, the spring force of the spring 40 acts in this case, with the result that the brake 30 is activated, which brings about venting of the brake 30. The valve groups 26 and therefore the hydraulic unit 16 therefore have redundancy which increases the safety of the system.

In contrast with the above, the brake cylinder assembly 24 can be embodied in the double-acting fashion. If both valves 28 are then intact in the second switched state the valve assembly 26 conducts the hydraulic oil which is under pressure into the second chamber 36 of the brake cylinder assembly 24 and at the same time disconnects the first chamber 38 from the hydraulic circuit 44. The hydraulic oil pressure present in the second chamber 36 then additionally acts on the piston 34 in order to move the braking device 14 from the vented switched state into the non-vented switched state. The brake cylinder assembly 24 is therefore embodied in a double-acting fashion.

Hydraulic oil flowing through the brake cylinder assembly 24 is collected in a collecting container 46 and fed back to the pump 22. In contrast with the present exemplary embodiment, the first chamber 38 or the collecting container 46 can be embodied as a pressure accumulator. A valve (not illustrated) which is arranged between the brake cylinder assembly 24 and the collecting container 46 is then opened.

For the elevator 2 to be put into service after the braking device 14 has been activated and service personnel have been deployed requires the pump 22 to build up a necessary operating pressure in the hydraulic circuit 44 again in order to be able to vent the brake 30.

What is claimed is:

1. An elevator including a braking device that comprises:
a hydraulically-acting brake for braking an elevator car of the elevator; and
a hydraulic unit that is fastened to the braking device and includes a pump assembly, a brake cylinder assembly, and a valve assembly for hydraulically ventilating the hydraulically-acting brake, wherein the brake cylinder assembly includes a piston that is displaceable in a cylinder and divides an interior space of the cylinder into a first chamber and a second chamber, wherein the piston is prestressed in a sprung fashion by a spring disposed in the second chamber, wherein the valve assembly includes a valve such that in a first switched state the valve hydraulically ventilates the hydraulically-acting brake,
wherein in the first switched state of the valve the first chamber of the cylinder is connected to the pump assembly so as to deliver hydraulic oil to the first chamber of the cylinder of the brake cylinder assembly,
wherein in a second switched state of the valve the second chamber of the cylinder is connected to the pump assembly so as to deliver hydraulic oil to the second chamber of the cylinder of the brake cylinder assembly,
wherein in the second switched state of the valve both the spring and pressurized hydraulic oil in the second chamber act on the piston to activate the hydraulically-acting brake.

2. The elevator of claim 1 further comprising a common housing that receives the pump assembly, the brake cylinder assembly, and the valve assembly.

3. The elevator of claim 1 wherein the braking device further comprises a base body to which the hydraulic unit is fastened.

4. The elevator of claim 1 wherein the pump assembly includes a submersible pump.

5. The elevator of claim 1 wherein the valve of the valve assembly is a 3/2-way valve.

6. The elevator of claim 1 wherein the valve assembly includes at least two valves that are connected in parallel.

7. The elevator of claim 1 wherein the hydraulic unit includes a closed hydraulic oil circuit.

8. The elevator of claim 7 wherein the hydraulic circuit is configured to conduct hydraulic oil that escapes from the cylinder of the brake cylinder assembly to the pump assembly.

9. A braking device comprising:
a base body;

a hydraulically-acting brake; and a hydraulic unit that is fastened to the base body and comprises a pump assembly, and a brake cylinder assembly that includes a piston that is displaceable in a cylinder, wherein the piston divides an interior space of the cylinder into a first chamber and a second chamber, wherein the piston is biased by a spring disposed in the second chamber, wherein hydraulic oil disposed in the second chamber is configured to exert a force on the piston.

10. The braking device of claim 9 wherein the hydraulic oil in the second chamber is pressurized.

11. The braking device of claim 9 wherein the hydraulic unit further comprises a valve assembly with a valve, wherein in a first switched state of the valve the first chamber of the cylinder is hydraulically connected to the pump assembly such that the pump assembly delivers hydraulic oil to the first chamber of the cylinder of the brake cylinder assembly, wherein in a second switched state of the valve the second chamber of the cylinder is hydraulically connected to the pump assembly such that the pump assembly delivers hydraulic oil to the second chamber of the cylinder of the brake cylinder assembly, wherein in the second switched state of the valve both the spring and the hydraulic oil in the second chamber that is pressurized act on the piston to activate the hydraulically-acting brake.

12. The braking device of claim 9 wherein the pump assembly includes a submersible pump.

13. The braking device of claim 9 wherein the valve of the valve assembly is a 3/2-way valve.

14. The braking device of claim 9 wherein the valve is a first valve, wherein the valve assembly comprises a second valve with the same structure as the first valve, wherein the first and second valves are connected in parallel.

15. The braking device of claim 9 wherein the hydraulic unit includes a closed hydraulic oil circuit.

16. The braking device of claim 9 wherein the spring is a disk spring packet.

17. The braking device of claim 9 comprising a collecting container disposed between the brake cylinder assembly and the pump assembly.

18. The braking device of claim 17 comprising a valve disposed between the collecting container and the pump assembly.

* * * * *